Figure 1:
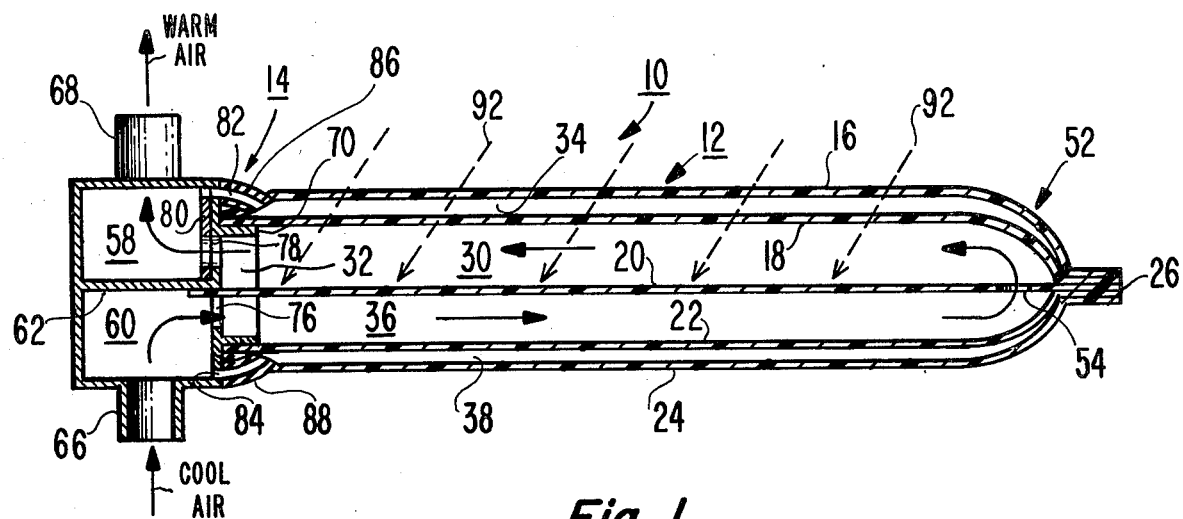

United States Patent [19]

Fairbanks

[11] 4,126,121

[45] Nov. 21, 1978

[54] SOLAR ENERGY HEAT APPARATUS

[75] Inventor: David W. Fairbanks, Monmouth Junction, N.J.

[73] Assignee: RCA Corporation, New York, N.Y.

[21] Appl. No.: 822,202

[22] Filed: Aug. 5, 1977

[51] Int. Cl.² ............................................. F24J 3/02
[52] U.S. Cl. .................................... 126/270; 126/271
[58] Field of Search ............... 126/270, 271; 237/1 A; 60/641

[56] References Cited

U.S. PATENT DOCUMENTS

| 3,952,724 | 4/1976  | Pei             | 126/271 |
| 4,016,860 | 4/1977  | Moan            | 126/271 |
| 4,043,318 | 8/1977  | Pei             | 126/271 |
| 4,059,095 | 11/1977 | Grundmann et al.| 126/271 |

Primary Examiner—Kenneth W. Sprague
Attorney, Agent, or Firm—H. Christoffersen; Samuel Cohen; William Squire

[57] ABSTRACT

A plurality of thermoplastic sheets of film are heat sealed to form complementary first and second heat transfer chambers for a pressurized fluid that is supplied to one of the chambers and which flows to the other of the chambers through an opening in the film intermediate the chambers. The film exposed to sunlight is transparent permitting solar energy to impinge upon a film disposed within the chambers for heating the chambers. Fluid ducts are connected to the apparatus for supplying the fluid under pressure to one of the chambers and for receiving the heated fluid from the other of the chambers.

9 Claims, 4 Drawing Figures

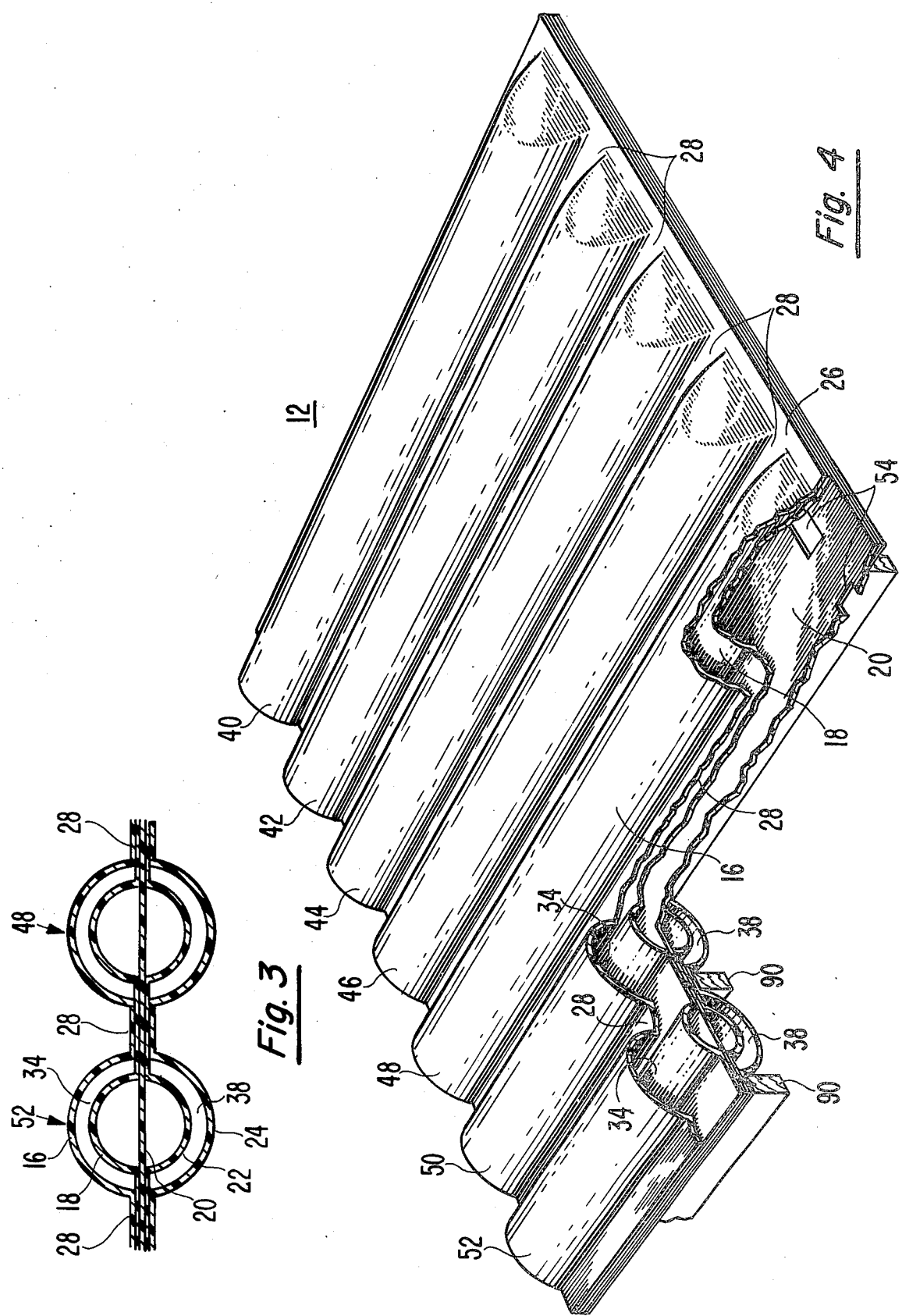

SOLAR ENERGY HEAT APPARATUS

The present invention relates to solar heaters. Prior art solar heat transfer apparatus usually are of the hot water type. In these, pipes or conduits are formed which are interconnected in housings which are adapted to convert solar energy to elevated temperatures for heating the hot water flowing in the pipes. Some apparatus utilize corrugated sheet material in which the fluid flows among the corrugations. In any event these materials are relatively stiff and need to be preformed. Further, once formed into the final configuration, they are relatively bulky and may require assembly at the site of separate components requiring skilled craftsman. Such requirements add cost to the solar collecting systems and negate the economical purposes of solar heating systems.

In accordance with the present invention, a solar energy heat transfer apparatus comprises a first sheet of thermoplastic film having a solar energy absorbent surface, a second sheet of thermoplastic film on one side of the first sheet forming with the first sheet at least one fluid conduit, and a third sheet of thermoplastic film disposed on the other side of the first sheet and forming with the first sheet at least one fluid conduit complementary to the one conduit formed by the second sheet. An opening is formed in the first sheet for providing fluid communication between the conduits at one end thereof. A fluid port is formed at the other end of each of the conduits, one port being formed by the first and second sheets and the other port being formed by the first and third sheets. One of the second and third sheets is light transparent.

Figure 2:
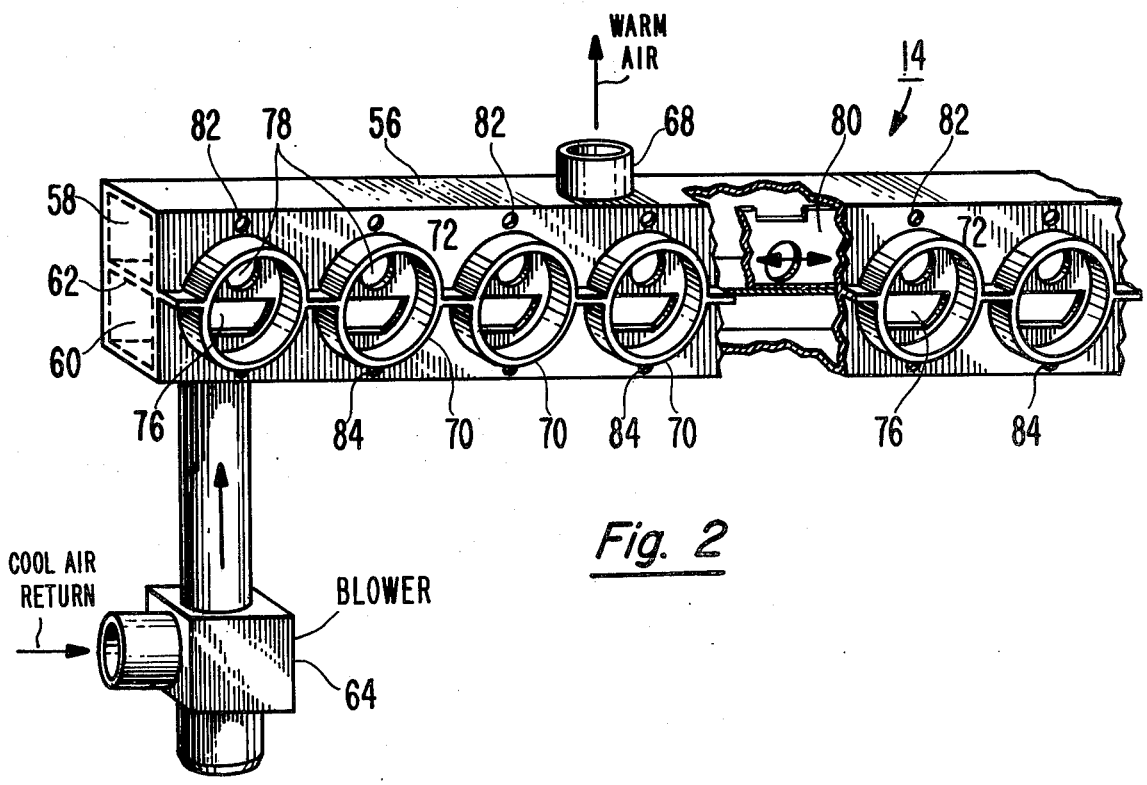

In the drawing:

FIG. 1 shows a sectional, side elevational view of an apparatus embodying the present invention, FIG. 2 is an isometric view of the ducts used in the embodiment of FIG 1, FIG. 3 is an end sectional view illustrating the construction of the embodiment of FIG. 1, and FIG. 4 is an isometric, partially fragmented, view of the heat transfer portion of the embodiment of FIG. 1.

In FIG. 1 apparatus 10 includes solar energy converter 12 and duct assembly 14 for supplying air to the converter 12 under pressure and for receiving heated air from the converter 12 and distributing the heated air to a conventional hot air heating system (not shown). The converter 12 is made of five sheets, 16, 18, 20, 22 and 24 of thermoplastic film. This film is conventional, thermoplastic sheet stock which is widely available. The film is pliable and light and may be made of 10 mil. thick sheet stock and is easily transportable. When not in use, the sheets forming the converter 12 may be rolled up or folded to form a compact, inexpensive assembly. With no air blowing in the system, the converter 12 remains limp and shapeless. Upon pressurized air being supplied to the converter 12, the converter 12 inflates to the shape illustrated in the drawing. The same air which is to be heated supplies the inflating pressures to the structure.

Centrally disposed sheet 20 is a black heat absorbing member. Disposed on top of the sheet 20 is sheet 18, which is heat sealed to sheet 20 at end 26 and along parallel heat seal joints 28 (FIG. 3). End 32 is not heat sealed. Sheets 18 and 20 form a semi-circular, tubular conduit 30 closed at end 26 and open at end 32. A larger sheet 16 overlaps sheet 18 and is heat sealed at end 26 and at the joints 28 to sheet 18 to form an insulating chamber 34 with sheet 18. Chamber 34 thermally insulates chamber 30 from the ambient.

In complementary fashion, sheets 22 and 24 are also heat sealed to sheet 20 at end 26 and along the joints 28. Preferably all the heat seals at a given joint are made simultaneously between each of the sheets 16, 18, 20, 22 and 24. Conduit 36 is complementary to conduit 30 and insulating chamber 38 formed by sheets 22 and 24 is complementary to chamber 34. Conduits 30 and 36 and chambers 34 and 38 extend linearly. The sheets via the heat sealed joints 28 are preferably formed into a plurality of conduits identical to the structure illustrated in FIG. 1. In FIG. 4 the converter 12 may comprise a number of conduit structures 40–52 in a parallel array. Each of the conduit structures is the same in construction as the conduit structure 50 illustrated in FIG. 1. An opening 54 in sheet 20 is formed adjacent end 26. A like opening is disposed in the sheet 20 connecting each of the conduits 30 and 36 of the separate structures 40–52.

In FIG. 3, sheets 18 and 22 form a substantially circular pipe divided by sheet 20. Sheets 16 and 24 also form a substantially circular pipe which is divided by sheets 18, 20 and 22. The circular section formed by these conduits is particularly advantageous for attachment to the ducts 14, FIG. 2.

Duct assembly 14 includes an elongated rectangular housing 56. The housing 56 is divided into an upper chamber 58 and a lower chamber 60 by divider 62 which extends the length of housing 56. The blower 64, FIG. 2, forces air to be heated into the chamber 60 via duct 66. The blower 64 may be a conventional blower in present heating systems. The duct 66 may attach a present heating system to the housing 56 in addition to other duct work (not shown) supplying cool air to a conventional hot air furnace. Duct 68 is connected to the upper chamber 58 for supplying heated air to the hot air distribution system (not shown). Circular connectors 70 are mounted on one side of the housing 56 in an array as shown. Horizontally disposed flanges 72 interconnect the connectors 70. Sheet 20 is cemented or otherwise fastened to the bottom side of flanges 72 and to the bottom surface of divider 62, FIGS. 1 and 2. Sheet 20 with the divider 62 form a continuous chamber between chamber 60 and conduit 36 via opening 76 in the housing 56 wall 55.

In communication with the upper chamber 58 is throttle opening 78. Throttle 80 is mounted adjacent opening 78 for throttling opening 78 from a fully opened to a fully closed condition. Throttle 80 slides in the direction of the arrow either by a manual control (not show) or by an automatic thermostatic control (not shown). Disposed above and below each of the connectors 70 are auxiliary openings 82 and 84. Auxiliary opening 82 is connected via a tube 86 to the chamber 34 while the opening 84 is connected via tube 88 to chamber 38. Tubes similar to tubes 86 and 88 connect each of the openings 82 and 84 to the corresponding chambers 34 and 38 of the remaining conduit structures. The sheets 16 and 18 are cemented or otherwise gas tight sealed to the peripheral outer surface of the connector 70.

Each of the joints 28 may be mounted on joists 90, for supporting the structure 12.

Sheets 16 and 18 are transparent to the light so that the suns rays 92, FIG. 1, penetrate through the sheets 16 and 18 and impinge upon the sheet 20 and are converted to heat by absorption. Sheet 20 thus becomes elevated in temperature due to the absorbed radiant energy. Sheets 22 and 24 are coated with aluminum material for providing radiation reflection. That is, the inner surfaces of sheets 22 and 24 have low emissivity and low absorbtivity, below 0.5. The surface of sheet 20 on the other hand has high absorbtivity, for example, above 0.5.

The chambers 34 and 38 form dead air spaces and are inflated via the tubes 86 and 88 by the pressurized air in the chambers 58, 60 respectively. Since there is no air flow through chambers 34 and 38, once inflated, the air within these chambers remains fairly stationary. While tubes 86 and 88 are shown for supplying the pressurized air to inflate the sheets 16 and 24 it is equally apparent that other means for supplying pressurized air may be provided for inflating these chambers. The openings 76 form a restriction to the air flow causing a higher air pressure in conduits 30 and 36 to keep them inflated. Throttle 80 partially closes the opening 78 to allow the air in the conduits 30 and 36 to reach satisfactory output temperature.

The output of the structure 12 can be used to heat buildings directly or can be so used to heat a storage medium such as stone heat-sink. Structure 12 can be mounted on a wall, a roof or tied to the ground to heat temporary buildings.

Cool air return supplied via duct 66 to chamber 60 passes through opening 76, inflating the chamber of conduit 36, passes through the opening 54 into conduit 30, and passes out of the structure 12 via the openings 78 and throttle 80 to the warm air chamber 58.

This structure can be inexpensively manufactured by heat sealing a number of inexpensive thermoplastic sheets together which are preformed to a suitable size and shape. The sheets, once sealed together, may be readily folded and compactly stored. Even after assembly to the duct assembly 14 the inflatable structure 12 is still readily foldable and compactly stored with assembly 14 comprising the bulk of the volume. Further, the light weight of the structure 12 makes it readily transportable without special tools and equipment.

What is claimed is:

1. A solar energy heat transfer apparatus comprising:
   first and second thermally insulated fluid chambers formed of pliable sheet material, said chambers having a common wall, said common wall having a solar energy absorbent surface, said chambers having a first deflated, relaxed condition in the absence of pressurized fluid therein and a second inflated condition in the presence of pressurized fluid therein,
   said common wall having an opening for providing fluid communication between said chambers,
   one of said chambers having a fluid inlet port for receiving pressurized fluid to be heated,
   the other of said chambers having a fluid discharge port,
   said ports and said opening being spaced such that said fluid passes over said common wall in said first and second chambers in flowing from said inlet to said discharge ports, one of said chambers having a light transparent outer wall.

2. The apparatus of claim 1 further including third and fourth chambers each having an outer wall formed of pliable sheet material, said first and third chambers having a common wall therebetween, said third and fourth chambers including aperture means for receiving pressurized fluid for placing said third and fourth chambers in an inflated condition whereby said third and fourth chambers provide thermal insulation for said first and second chambers, respectively.

3. The apparatus of claim 1 wherein said first and second chambers are formed as tubular conduits disposed in complementary arrangement about said common wall, said common wall opening being disposed at one end of said conduits, said ports being disposed at the other end.

4. The apparatus of claim 3 wherein said common wall is disposed common to said inlet and outlet ports.

5. The apparatus of claim 1 including a plurality of said first and second chambers placed side-by-side in a parallel array, said first chamber being disposed above said second chamber, said common wall being formed of a first sheet of thermoplastic film extending through all said first and second chambers, the outer walls of said first chambers being formed of a second sheet of thermoplastic film and the outer walls of said second chamber being formed of a third sheet of thermoplastic film.

6. The apparatus of claim 5 further including a fourth sheet of thermoplastic film spaced from and forming an insulating chamber with a wall of each said first chambers, and a fifth sheet of thermoplastic film spaced from and forming an insulating chamber with a wall of each of said second chambers.

7. A solar energy heat transfer apparatus comprising:
   A first sheet of thermoplastic film having a solar energy absorbent surface,
   a second sheet of thermoplastic film on one side of said first sheet forming with said first sheet at least one fluid conduit,
   a third sheet of thermoplastic film disposed on the other side of said first sheet and forming with said first sheet at least one fluid conduit complementary to the one conduit formed by said second sheet,
   an opening in said first sheet providing fluid communication between said at least one conduits at one end of said conduit, and
   a fluid port at the other end of each said conduit one port being formed by said first and second sheet, the other port being formed by said first and third sheet,
   one of said second and third sheets being light transparent.

8. The apparatus of claim 7 further including a fourth sheet of thermoplastic film overlapping said second sheet and forming a first chamber enclosing said first mentioned at least one conduit on one side thereof, and a fifth sheet of thermoplastic film overlapping said third sheet and forming a second chamber enclosing said at least one conduit complementary to the one conduit on one side thereof.

9. The apparatus of claim 7 further including duct means in fluid communication with said fluid ports for supplying pressurized fluid to one of said ports and receiving pressurized fluid from the other of said ports.

* * * * *